US009195568B2

(12) United States Patent
Lopian et al.

(10) Patent No.: US 9,195,568 B2
(45) Date of Patent: Nov. 24, 2015

(54) METHODS, CIRCUITS, APPARATUS, SYSTEMS AND ASSOCIATED SOFTWARE MODULES FOR EVALUATING CODE BEHAVIOR

(75) Inventors: Eli Lopian, Tel Aviv (IL); Doron Peretz, Pardesia (IL)

(73) Assignee: TYPEMOCK LTD., Tel-Aviv (IL)

( * ) Notice: Subject to any disclaimer, the term of this patent is extended or adjusted under 35 U.S.C. 154(b) by 298 days.

(21) Appl. No.: 13/366,333

(22) Filed: Feb. 5, 2012

(65) Prior Publication Data

US 2012/0222018 A1 Aug. 30, 2012

Related U.S. Application Data

(60) Provisional application No. 61/447,411, filed on Feb. 28, 2011.

(51) Int. Cl.
*G06F 9/44* (2006.01)
*G06F 9/455* (2006.01)
*G06F 11/36* (2006.01)

(52) U.S. Cl.
CPC ........ *G06F 11/3664* (2013.01); *G06F 11/3636* (2013.01); *G06F 9/455* (2013.01)

(58) Field of Classification Search
CPC .. G06F 11/3664; G06F 9/455; G06F 9/45542
USPC ............................................... 717/134–135
See application file for complete search history.

(56) References Cited

U.S. PATENT DOCUMENTS

| 5,613,098 | A  | * | 3/1997 | Landau et al. | 703/20 |
| 8,352,923 | B2 | * | 1/2013 | Lopian | 717/135 |
| 8,495,664 | B2 | * | 7/2013 | Herta | 719/330 |
| 8,732,670 | B1 | * | 5/2014 | Daudel et al. | 717/127 |
| 2006/0174226 | A1 | * | 8/2006 | Fair et al. | 717/127 |

OTHER PUBLICATIONS

Farias et al., "Java Simulations of Embedded Control Systems," MDPI.com, 2010, 19pg.*

\* cited by examiner

*Primary Examiner* — Ryan Coyer

(74) *Attorney, Agent, or Firm* — Vladimir Sherman; Professional Patent Solutions

(57) ABSTRACT

Disclosed are methods, circuits, apparatus, systems and associated software modules for dynamically evaluating code behavior in runtime. There is provided a code testing platform and/or framework which may include: (1) a code execution environment instancing module (CEEIM), (2) code execution resources, (3) executed code isolation logic, and (4) code call response logic. The CEEIM may instance, on a computing platform, a code execution environment (CEE) which is at least partially isolated from external resources functionally associated with the computing platform. The CEE may include code execution resources adapted to execute code whose behavior is to be evaluated, wherein a resource call generated from code execution may be analyzed by the code isolation logic and may under certain conditions be routed to the code call response logic.

24 Claims, 6 Drawing Sheets

METHODS, CIRCUITS, APPARATUS, SYSTEMS AND ASSOCIATED SOFTWARE MODULES FOR EVALUATING CODE BEHAVIOR

CROSS REFERENCE

The present application claims the benefit of U.S. Provisional Patent Application 61/447,411, filed Feb. 28, 2011, the disclosure of which is incorporated herein by reference.

FIELD OF THE INVENTION

Some embodiments relate generally to the field of computer program development and, more particularly, to methods, circuits, apparatus, systems and associated software modules for evaluating code behavior.

BACKGROUND

Throughout the history of computer systems and the programs executed by computer systems, computer programmers have aspired to produce programming code that is both efficient and meticulous. Automation of real world functions and calculations can be performed in breathtaking speed by modern computer systems. In recent history, computer systems have been programmed to defeat chess grandmasters and trivia geniuses. They have been programmed to calculate intricate weather patterns and patterns of internet usage.

Powerful computer systems are ubiquitous; they are being used to control international banking systems, healthcare systems, systems of transport and educational networks. Computers gathered in a server farm can contain all the banking records for an international bank or all the healthcare records of a country. It has become more vital than ever for these computer systems to have accurate and efficient programs running on them.

The first known use of the term "bug" as referring to a computer system or programming error was popularized by a moth being trapped in a Mark II computer system relay in 1947, thereby causing a malfunction. Since that time, computer bugs have been credited with numerous human casualties and monetary loss.

Modern computer systems execute vast amounts of programming code each second, and each line of programming code is susceptible to many types of bugs. Bugs can be arithmetic (e.g. division by zero, careless rounding), logical (e.g. infinite loops), incorrect syntax, resource, interface and performance in nature. Programming bugs are found, validated (e.g. reproducible) and fixed (e.g. patched) through a process called debugging.

Debugging systems, tools and software are not new. Debugging tools can include execution monitors, specified breaking and adjusting memory values. High level programming languages have built in debugging features (e.g. exception handling) allowing for automated error detection. Static code analysis tools may include sets of hundreds of known program code problems and can be designed for a specific programming language or many programming languages. Programming code found on an embedded system can be debugged with an in-circuit emulator.

Computer systems regularly interact with many types of data sources and data sinks, each with unpredictable behavior. When interacting with an external data source, a computer system must be programmed specifically for the device. To interact with an external device, the computer system must have prior knowledge of the expected behavior of such a device and there must also be an ability to test a computer system program code for compatibility with the device. Anomalies and/or discrepancies in a computer system program code must be debugged to ensure device compatibility. This may be accomplished by testing the code within a controlled testing environment with an ability to simulate any internal and external device, system or program.

When a computer system is executing vast amounts of program code, the task of debugging becomes proportionally vast. Therefore, an adequate code testing environment must be based on succinct programming while remaining powerful and robust. The code testing environment must be compatible with many computer systems and programming languages. Ideally, a robust testing environment should be compatible with all objects and function types and should be able to test program code while compiling and during runtime.

There is thus a need in the field of computer program development for improved methods, circuits, apparatus, systems and associated software modules for evaluating code behavior.

SUMMARY OF THE INVENTION

The present invention includes methods, circuits, apparatus, systems and associated software modules for dynamically evaluating code behavior in runtime. According to some embodiments of the present invention, there is provided a code testing platform and/or framework which may include: (1) a code execution environment instancing module (CEEIM), (2) code execution resources, (3) executed code isolation logic, and (4) code call response logic. According to some embodiments of the present invention, the CEEIM may instance, on a computing platform, a code execution environment (CEE) which is at least partially isolated from external resources functionally associated with (on or connected to) the computing platform. The CEE may include code execution resources adapted to execute code whose behavior is to be evaluated, wherein a resource call generated from code execution may be analyzed by the code isolation logic and may under certain conditions be routed to the code call response logic.

According to some embodiments of the present invention, code behavior evaluation in a CEE may be performed while isolating the code from one or more external resources (e.g. hardware access, services, functions, methods, data, etc.) generally associated with a runtime execution of the code. According to further embodiments of the present invention, the executed code isolation logic may detour the code during evaluation using one or more hooks and/or code interceptors. A hook or code interceptor may modify code instructions to jump to an injected code (e.g. testing code associated with the code call response logic). According to further embodiments of the present invention, code detoured during evaluation may be returned to an original runtime location (e.g. to a return address in program and/or system memory).

According to some embodiments of the present invention, code under evaluation may be detoured at a low level system layer (e.g. assembly layer). According to further embodiments of the present invention, routing and/or detouring may be based on existing routing and/or detouring technology (e.g. Microsoft Detours technology) and may be modified for the computing platform and/or programming language. According to further embodiments of the present invention, detouring may be unobtrusive to code execution (e.g. by not modifying call stack information).

According to some embodiments of the present invention, the executed code isolation logic may select a resource call based on a match with a resource call listed in a predetermined and/or preprogrammed list of resource calls. The resource calls determined for the list may be selected by a user prior to code behavior evaluation. According to further embodiments of the present invention, matching a resource call may include decrypting, during code execution, (1) code debug data, (2) data from one or more associated address tables and/or (3) data in some data structure either in memory or on a disk (e.g. repository). Matching a resource call may include identifying a resource call based on the encrypted data associated with the resource call.

According to some embodiments of the present invention, the code call response logic may generate a response to the routed and/or detoured call based on one or more testing parameters. According to further embodiments of the present invention, the code call response logic may select the one or more testing parameters from a predetermined/preprogrammed list of testing parameters (e.g. one or more default values and/or based on expected runtime behavior). According to further embodiments of the present invention, testing parameters may be programmed by a user prior to code behavior evaluation. User expected testing parameters may be programmed using Application programming interfaces (APIs) associated with an evaluated code programming language, thereby obviating a need for a proprietary testing parameters programming syntax.

According to some embodiments of the present invention, the code call response logic may forward a generated response to the code isolation logic. The generated response may be based on a user selected input or value. According to further embodiments of the present invention, the generated response may be a call, a custom implementation or a selected return value. If no value is returned by a function or method, the function or method body may be skipped. According to further embodiments of the present invention, the generated response may include a faked method call verification, wherein a faked method is a method detoured, routed, or otherwise modified at runtime. According to further embodiments of the present invention, the code isolation logic may forward the generated response to an originating code.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
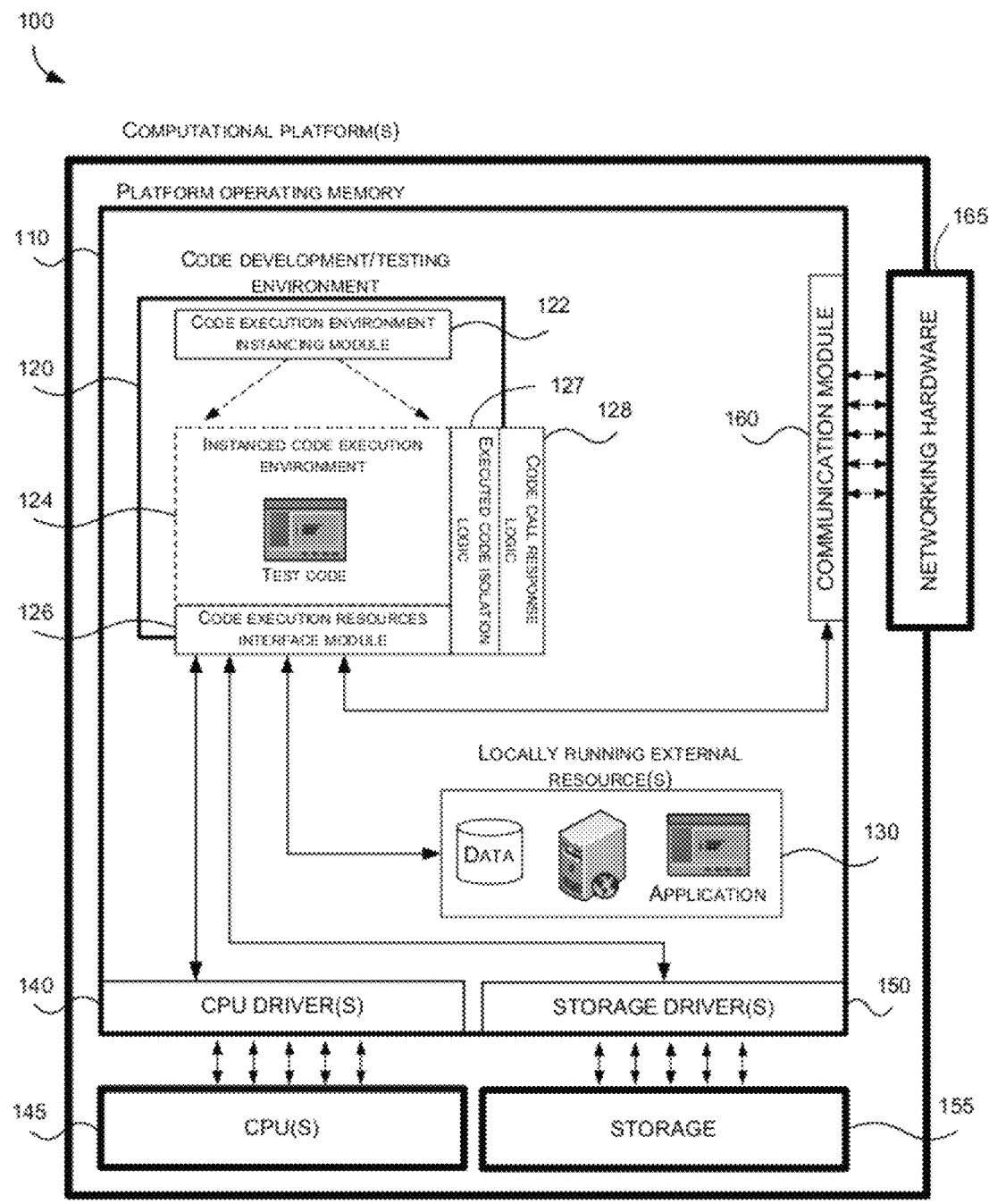
FIG. 1 is a diagram showing a computational platform including a code development/testing environment, according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that some embodiments may be used in a variety of applications. Although embodiments of the invention are not limited in this respect, one or more of the methods, devices and/or systems disclosed herein may be used in many applications, e.g., civil applications, military applications, medical applications, commercial applications, or any other suitable application. In some demonstrative embodiments the methods, devices and/or systems disclosed herein may be used in the field of consumer electronics, for example, as part of any suitable television, video Accessories, Digital-Versatile-Disc (DVD), multimedia projectors, Audio and/or Video (A/V) receivers/transmitters, gaming consoles, video cameras, video recorders, portable media players, cell phones, mobile devices, and/or automobile A/V accessories. In some demonstrative embodiments the methods, devices and/or systems disclosed herein may be used in the field of Personal Computers (PC), for example, as part of any suitable desktop PC, notebook PC, monitor, and/or PC accessories.

According to some embodiments of the present invention, there includes a system for evaluating code behavior comprising: a code execution environment instancing module (CEEIM) configured to instance a code execution environment (CEE); one or more code execution resources configured to execute one or more code segments within the code execution environment; and executed code isolation logic configured to selectively analyze resource calls generated from code execution and to forward selected calls to a code call response logic. The code call response logic may be further configured to generate a response to the selected call based on one or more testing parameters.

According to some embodiments of the present invention, the response logic may be further configured to forward the generated response to the isolation logic. According to further embodiments of the present invention, the isolation logic may be further configured to forward the generated response to an originating code.

According to some embodiments of the present invention, the testing parameters may be preprogrammed based on expected runtime behavior. According to further embodiments of the present invention, the testing parameters may be preprogrammed using substantially the same programming syntax as the tested code. According to some embodiments of the present invention, the testing parameters may be extracted from a default list of runtime behaviors.

According to some embodiments of the present invention, selected resource calls may be substantially isolated from external resources. According to further embodiments of the present invention, external resources may be from the group consisting of services, functions, methods and data, in addition to hardware access associated with the services, functions methods and data.

According to some embodiments of the present invention, the executed code isolation logic may further comprise a code interceptor configured to detour a selected call to an injected code. According to further embodiments of the present invention, the injected code may be a testing code associated with the code call response logic. According to further embodiments of the present invention, the code call response logic may be further configured to return a detoured selected call to a location substantially associated with the code execution. According to further embodiments of the present invention, the location substantially associated with the code execution may be a memory address. According to further embodiments of the present invention, the code interceptor may be configured to detour a selected call at a substantially low level system layer.

According to some embodiments of the present invention, there includes a method of code testing comprising: intercepting resource calls from a testing system, selectively analyzing and routing intercepted resource calls, and generating a response to the selected call based on one or more testing parameters. According to further embodiments of the present invention, the generated response may be forwarded to an originating code.

According to some embodiments of the present invention, the testing parameters may be preprogrammed based on expected runtime behavior. According to further embodiments of the present invention, the testing parameters may be preprogrammed using substantially the same programming syntax as the tested code. According to further embodiments of the present invention, the testing parameters may be extracted from a default list of runtime behaviors.

According to some embodiments of the present invention, selected resource calls may be substantially isolated from external resources. According to further embodiments of the present invention, external resources may be from the group consisting of services, functions, methods and data, in addition to hardware access associated with the services, functions methods and data.

According to some embodiments of the present invention, the method may further comprise detouring a selected call to an injected code. According to further embodiments of the present invention, the method may further comprise returning a detoured selected call to a location substantially associated with the code execution. According to further embodiments of the present invention, the location substantially associated with the code execution may be a memory address. According to some embodiments of the present invention, a selected call may be detoured at a substantially low level system layer.

Now turning to FIG. 1, there is shown a computational platform (100) including a code development/testing environment (120), according to some embodiments of the present invention.

According to some embodiments of the present invention, a computational platform (100) may include one or more CPUs (145), one or more storage devices (155), networking hardware (165), and/or platform operating memory (110). According to further embodiments of the present invention, the platform operating memory (110) may include one or more CPU drivers (140) to control the one or more CPUS (145), one or more storage drivers (150) to control the one or more storage devices (155) and/or a communication module (160) to control the networking hardware (165). According to further embodiments of the present invention, the platform operating memory may include one or more locally running external resources (130). The locally running external resources (130) may include a database, a web-based server, an application executed by the platform operating memory, and/or any other data source available to the platform operating memory (110).

According to some embodiments of the present invention, the platform operating memory (110) may include a code development/testing environment (120), functionally associated or otherwise integral to a code execution environment instancing module (122), executed code isolation logic (127), code call response logic (128) and/or a code execution resources interface module (126). According to further embodiments of the present invention, the code execution environment instancing module (122) may instance a code execution environment (120) which is at least partially isolated from resources functionally associated with the platform operating memory (110). According to further embodiments of the present invention, a test code, i.e. a code whose behavior is to be evaluated, may be executed within the code execution environment. According to further embodiments of the present invention, a test code may be isolated from resources functionally associated with the platform operating memory (e.g. hardware access, services, functions, methods and data) to facilitate testing during execution.

According to some embodiments of the present invention, the code execution resources interface module (126) may provide external resources for a test code during evaluation. According to some embodiments of the present invention, the test code may utilize one or more CPUs (145) via one or more CPU drivers (140), one or more storage devices (155) via one or more storage drivers (150), networking hardware (165) via a communication module (160), and/or one or more locally running external resources (130).

According to some embodiments of the present invention, an external resource call generated from test code execution may be analyzed by the executed code isolation logic (127) and may under certain conditions be routed and/or detoured to the code call response logic (128). According to further embodiments of the present invention, the code call response logic (128) may generate a response to the routed and/or detoured call based on one or more testing parameters. The testing parameters may be input by a user before code execution and/or evaluation. According to further embodiments of the present invention, the code call response logic (128) may forward the generated response to the code isolation logic (127). According to further embodiments of the present invention, the code isolation logic (127) may output the generated response to the instanced code execution environment (124). According to further embodiments of the present invention, code detoured during evaluation may be returned to an original runtime location (e.g. to a return address in program and/or system memory).

Figure 2:
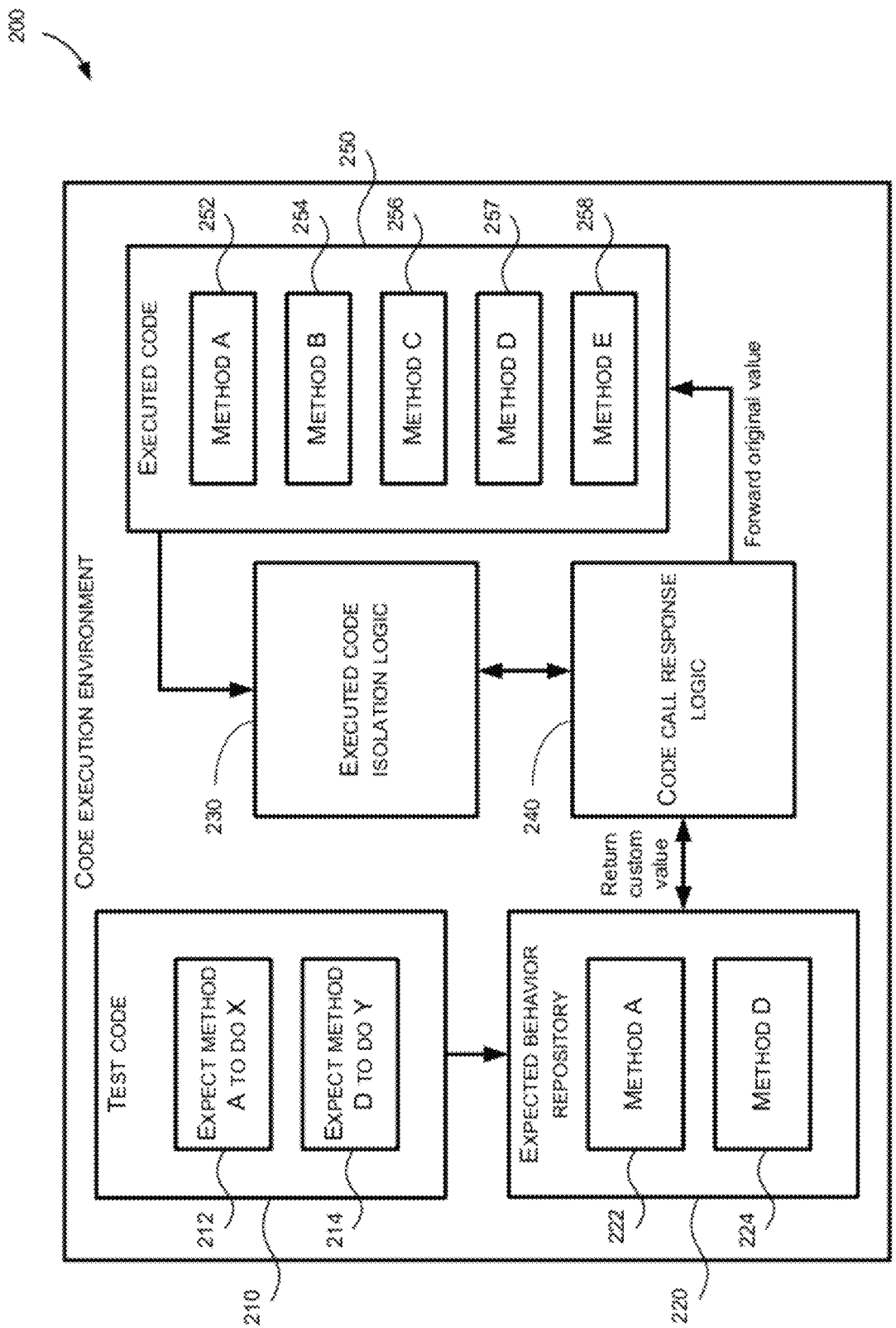
FIG. 2 is a functional block diagram of a code execution environment, according to some embodiments of the present invention.

Now turning to FIG. 2, there is shown a functional block diagram of a code execution environment (200), according to some embodiments of the present invention.

According to some embodiments of the present invention, the code execution environment may include a test code input (210), an expected behavior repository (220), executed code isolation logic (230), a code call response logic (240) and executed code (250). According to further embodiments of the present invention, the test code (210) may include one or more methods for testing (212 and 214), wherein each method may have an expected behavior data vector (e.g. method A expected to do X). The expected behavior data may be forwarded to the expected behavior repository (220) for initial code testing and analyzing.

According to some embodiments of the present invention, code call response logic (240—e.g. an isolation runtime decision engine) may forward the initial (e.g. original) values for one or more methods to be tested during code execution (250). According to further embodiments of the present invention, the executed code isolation logic (230—e.g. a detouring interception engine) may selectively detour a method for testing and may return a value based on the expected behavior data vector utilizing one or more functionally associated or integral resources and/or resource emulators. Based on execution and testing of the detoured code, the code call response logic (240) may determine an appropriate value, response and/or output. According to further embodiments of the present invention, the code call response logic (240) may return this custom value to the expected behavior repository (220).

Figure 3:
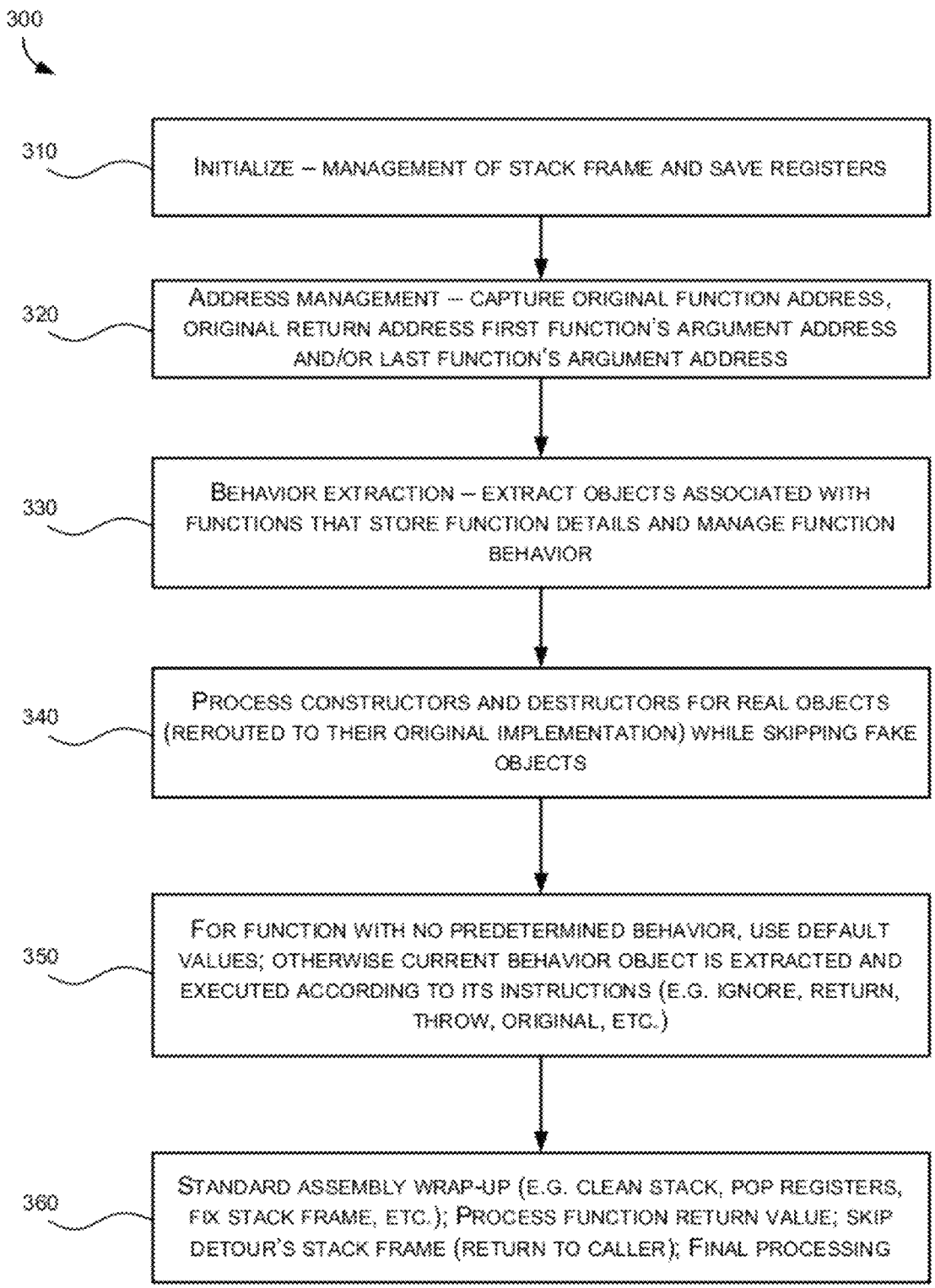
FIG. 3 is a flowchart including the steps of an exemplary method by which a code execution environment may operate, in accordance with some embodiments of the present invention.

Now turning to FIG. 3, there is shown a flowchart (300) including the steps of an exemplary method by which a code execution environment may operate, in accordance with some embodiments of the present invention.

According to some embodiments of the present invention, the code execution environment may initialize (310) code execution. Initialization may include managing a stack frame and/or saving registers (310). According to further embodiments of the present invention, code execution may include address management (320), wherein address management may include capturing one or more original function addresses, original return addresses and/or a first function's argument address (320). According to some embodiments of the present invention, address management may include capturing a last function's argument address. According to further embodiments of the present invention, any function's argument address may be captured from the stack based on a function specific signature and/or any other identifiable information.

According to some embodiments of the present invention, code execution may include behavior extraction (330), wherein behavior extraction may include extracting one or more objects associated with functions that store function details and manages function behavior (330). According to further embodiments of the present invention, constructors may prepare real objects for execution (e.g. rerouted to their original implementation) while skipping fake objects i.e. objects preprogrammed to be detoured during program execution (340). Destructors may terminate the objects after execution (340).

According to some embodiments of the present invention, when a function routed for testing has no predetermined behavior, default values may be used during the execution of the function (350). According to further embodiments of the present invention, when the function routed for testing has a current behavior object associated with it, execution of the function may be according to instructions extracted from the behavior object (350). According to further embodiments of the present invention, after code execution is completed for a routed code, the code execution environment may clean a stack (e.g. including function arguments, return address and variables), pop registers and/or fix stack frames associated with the routed code execution (360). According to further embodiments of the present invention, a routed code return value may be processed and code execution may return to a memory location associated with an original call of routed code (360). Any additional final processing may be performed after returning to the original call (360).

Figure 4:
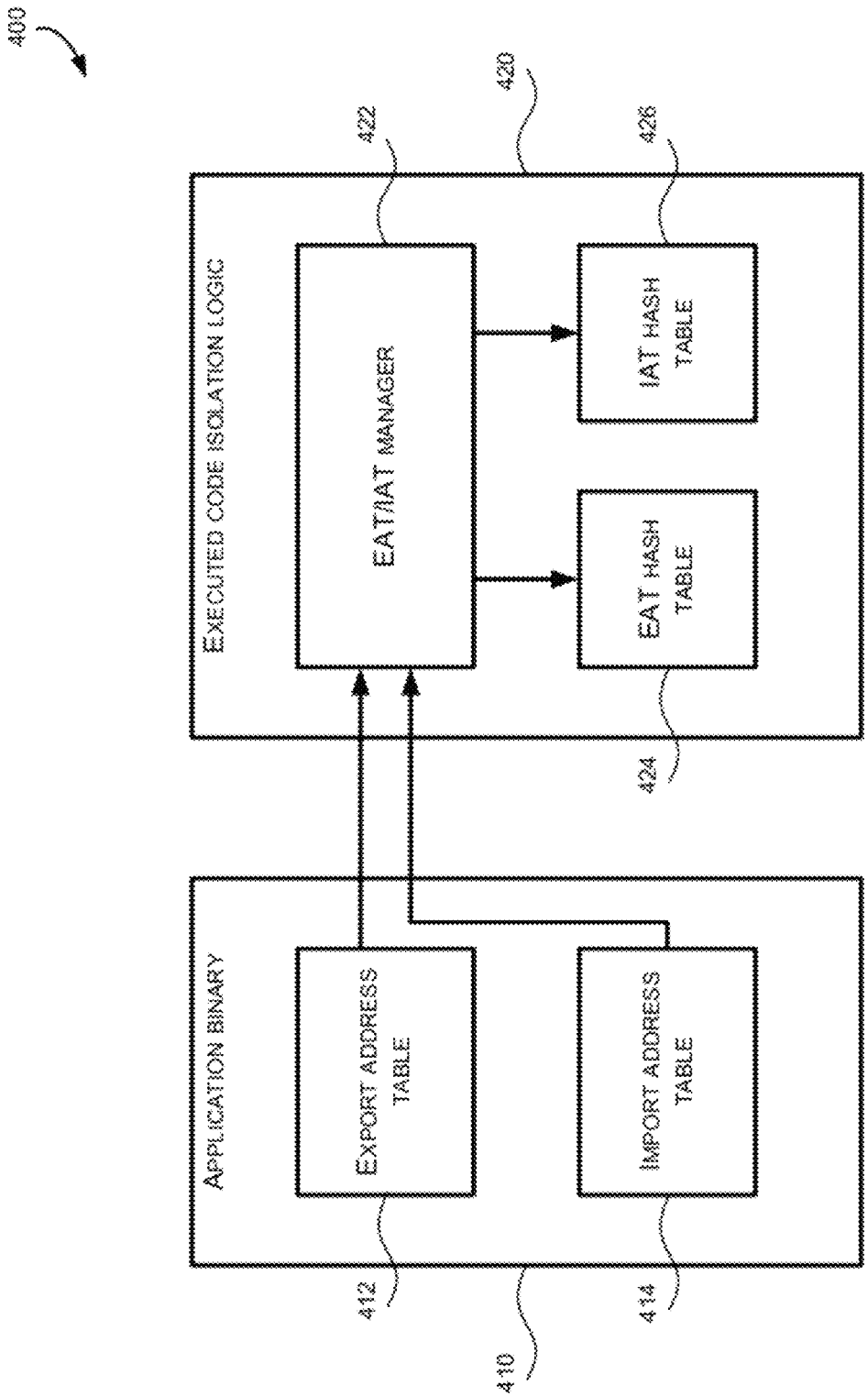
FIG. 4 is a diagram showing extracting a program export address table and/or a program import address table within a code execution environment, according to some embodiments of the present invention.

Now turning to FIG. 4, there is a diagram showing extracting a program export address table and/or a program import address table within a code execution environment (400), according to some embodiments of the present invention.

According to some embodiments of the present invention, a code segment may be prepared for execution by exporting object definitions after the code is compiled. Exporting object definitions may include editing and/or changing object storage definitions. According to further embodiments of the present invention, the exported object definitions may be stored in an export address table (EAT—412) located in an application binary (410) integral to or otherwise functionally associated with execution of the code segment.

According to some embodiments of the present invention, before execution of the code segment and after the code is compiled, an import address table (IAT—414) located in the application binary (410) may collect object definitions, symbols and/or addresses from one or more code libraries.

According to some embodiments of the present invention, an EAT/IAT manager (422) functionally associated with an executed code isolation logic (420) may read object definitions from the application binary (410). According to further embodiments of the present invention, exported object definitions may be read from the EAT (412) and stored in an integral or otherwise functionally associated EAT hash table (424). According to further embodiments of the present invention, imported object definitions may be read from the IAT (414) and stored in an integral or otherwise functionally associated IAT hash table (426). According to some embodiments of the present invention where there is no EAT (e.g. in some Linux environments), the EAT/IAT manager may read object definitions exclusively from an IAT (414).

Figure 5:
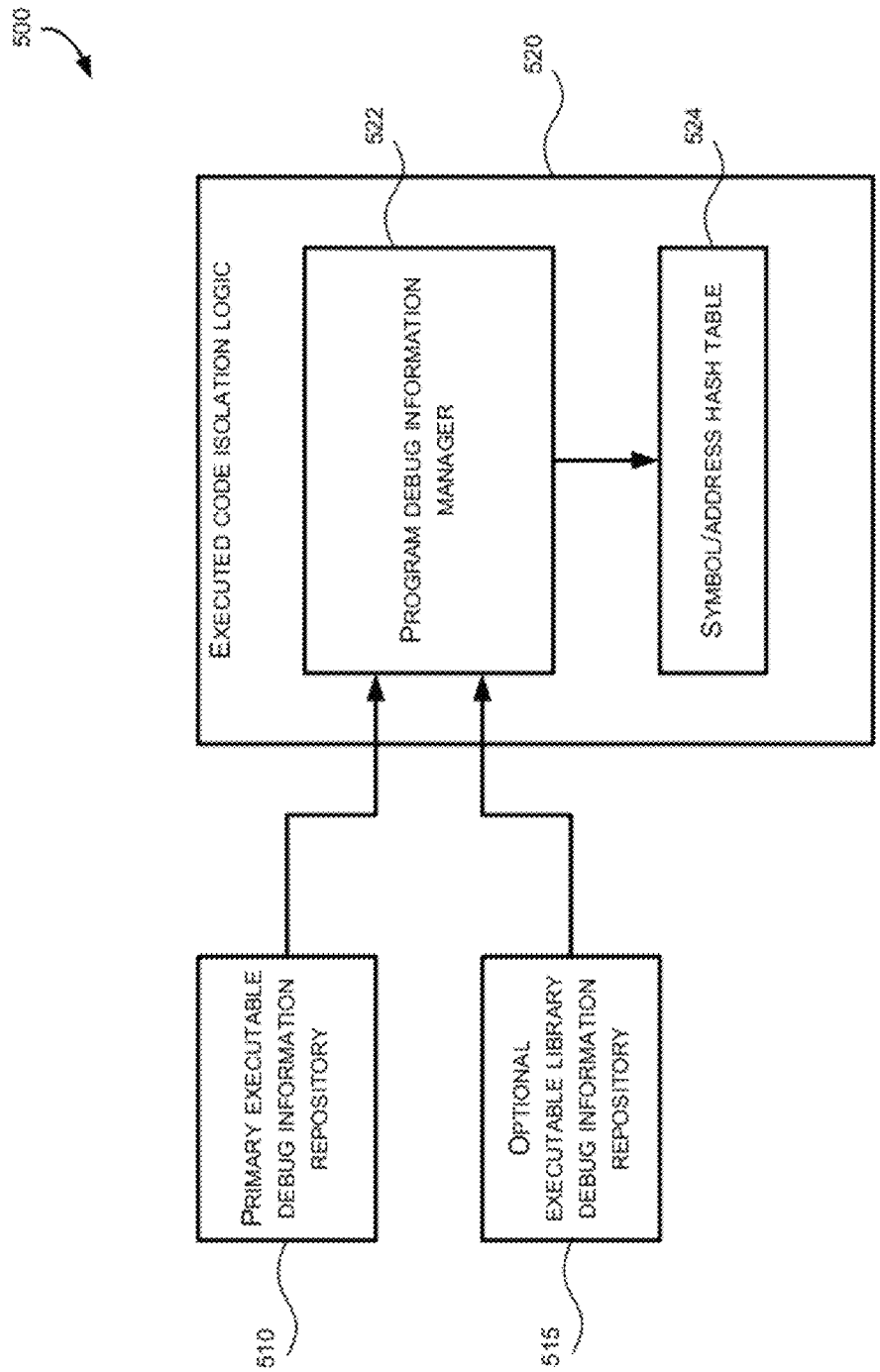
FIG. 5 is a diagram showing extracting program debug information within a code execution environment, according to some embodiments of the present invention.

Now turning to FIG. 5, there is a diagram showing extracting program debug information within a code execution environment (500), according to some embodiments of the present invention.

According to some embodiments of the present invention, a program debug information manager (522), functionally associated with an executed code isolation logic (520), may dynamically detect object definitions, symbols and/or addresses stored in a primary executable debug information repository (510). Object definitions, symbols and/or addresses may be detected in an optional executable library debug information repository (515). According to further embodiments of the present invention, the program debug information manager (522) may store read object definitions, symbols and/or addresses in an integral or otherwise functionally associated symbol/address hash table (524).

Figure 6:
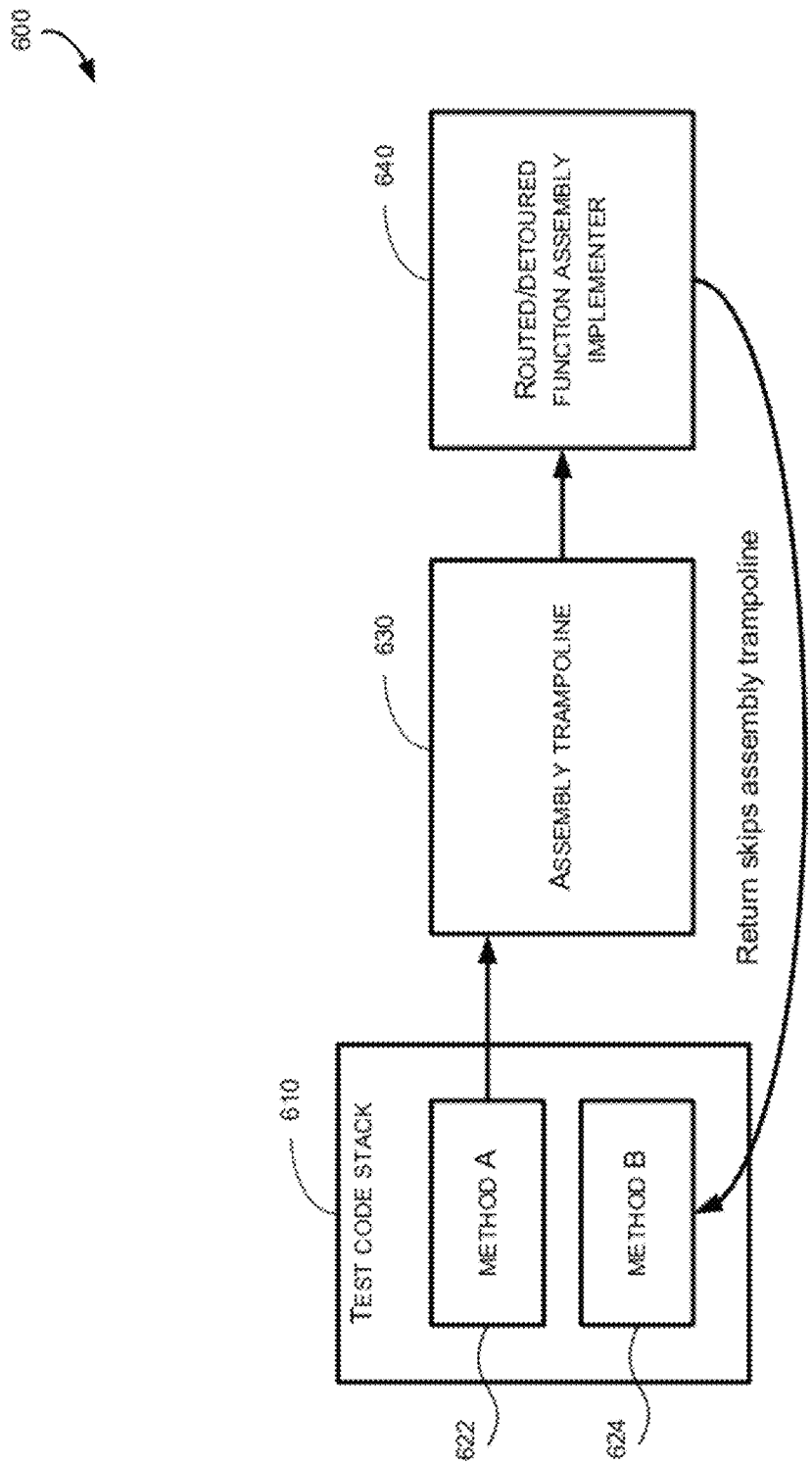
FIG. 6 is a diagram showing routing and/or detouring functionality, according to some embodiments of the present invention.

Now turning to FIG. 6, there is a diagram showing routing and/or detouring functionality (600), according to some embodiments of the present invention. According to some embodiments of the present invention, routing and/or detouring may be performed by a set of instructions substantially in line with the test code.

According to some embodiments of the present invention, a test code stack (610) may include one or more methods for testing (622 and 624). When the test code is executed, a method (e.g. method A) selected for routing and/or detouring may be forwarded via an assembly trampoline (630) to a functionally associated routed/detoured function assembly implementer (640). The assembly implementer (640) may receive a return address associated with the selected method. According to further embodiments of the present invention, after the assembly implementer (640) executes its algorithm, the assembly implementer may return the test code stack (610) to a location relating to the received return address (e.g. method B). The test code stack (610) may be edited and/or corrected prior to returning the test code stack (610) to a location relating to the received return address.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can comprise, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A system for evaluating code behavior comprising:
a code execution environment instancing module (CEEIM) comprising processing circuitry configured to instance a code execution environment (CEE);
one or more code execution resources comprising processing circuitry configured to execute one or more code segments of a given native machine code being evaluated, within said code execution environment; and
executed code isolation logic comprising processing circuitry configured to selectively analyze resource calls from code execution of the given native machine code and to forward selected calls to a code call response logic configured to determine a call response format corresponding to the selected call and to dynamically generate code for replacing a called resource, which generated code is configured to respond to the selected call in accordance with the determined format.

2. The system according to claim 1, wherein said response logic is further configured to forward the generated response to said isolation logic.

3. The system according to claim 2, wherein said isolation logic is further configured to forward the generated response to an originating code.

4. The system according to claim 1, wherein the generated code is configured to respond to the selected call based on testing parameters and the testing parameters are preprogrammed based on expected runtime behavior.

5. The system according to claim 4, wherein the testing parameters are preprogrammed using substantially the same programming syntax as the tested code.

6. The system according to claim 1, wherein the generated code is configured to respond to the selected call based on testing parameters and the testing parameters are extracted from a default list of runtime behaviors.

7. The system according to claim 1, wherein selected resource calls are substantially isolated from external resources.

8. The system according to claim 1, further comprising an EAT/IAT manager functionally associated with said executed code isolation logic and configured to read object definitions from an export address table (EAT) or an import address table (IAT), wherein said object definitions are used by said response logic to generate the code for replacing a called resource.

9. The system according to claim 1, wherein said executed code isolation logic further comprises a code interceptor configured to detour a selected call to an injected code.

10. The system according to claim 9, wherein the injected code is a testing code associated with said code call response logic.

11. The system according to claim 9, wherein said code call response logic is further configured to return a detoured selected call to a location substantially associated with the code execution.

12. The system according to claim 11, wherein the location substantially associated with the code execution is a memory address.

13. The system according to claim 1, further comprising a program debug information manager functionally associated with said executed code isolation logic and configured to dynamically detect object definitions in a debug information repository, wherein said object definitions are used by said response logic to generate the code for replacing a called resource.

14. A method of code testing comprising:
intercepting a resource call, of a given native machine code being evaluated, from a testing system, selectively analyzing and routing the intercepted resource call, determining a call response format corresponding to the intercepted resource call and generating code for replacing a called resource, which code is configured to respond to the intercepted call in accordance with the determined format, based on one or more testing parameters, which testing parameters are user input values or a desired behavior of the given native machine code.

15. The method according to claim 14, wherein the generated response is forwarded to an originating code.

16. The method according to claim 14, wherein the testing parameters are preprogrammed based on expected runtime behavior.

17. The method according to claim 16, wherein the testing parameters are preprogrammed using substantially the same programming syntax as the tested code.

18. The method according to claim 14, wherein the testing parameters are extracted from a default list of runtime behaviors.

19. The method according to claim 14, wherein selected resource calls are substantially isolated from external resources.

20. The method according to claim 14, further comprising reading object definitions from an export address table (EAT) or an import address table (IAT), wherein the object definitions are used to generate the code for replacing a called resource.

21. The method according to claim 14, further comprising detouring a selected call to an injected code.

22. The method according to claim 21, further comprising returning a detoured selected call to a location substantially associated with the code execution.

23. The method according to claim 22, wherein the location substantially associated with the code execution is a memory address.

24. The method according to claim 21, further comprising reading object definitions in a debug information repository, wherein the object definitions are used to generate the code for replacing a called resource.

* * * * *